(12) United States Patent
Kang (10) Patent No.: US 7,007,504 B2
(45) Date of Patent: Mar. 7, 2006

(54) CONDENSER

(76) Inventor: Kyeong-Hwa Kang, 237-7 Oseondong Kwangsan-gu, Kwangju (KR)

( * ) Notice: Subject to any disclaimer, the term of this patent is extended or adjusted under 35 U.S.C. 154(b) by 122 days.

(21) Appl. No.: 10/765,177

(22) Filed: Jan. 28, 2004

(65) Prior Publication Data

US 2004/0182107 A1    Sep. 23, 2004

(30) Foreign Application Priority Data

Jan. 29, 2003  (KR)  ............... 10-2003-0005902
Sep. 8, 2003   (KR)  ............... 10-2003-0062463

(51) Int. Cl.
  F25B 39/04   (2006.01)
  B21D 39/06   (2006.01)
  F24J 2/24    (2006.01)
  F28F 7/00    (2006.01)
  F28D 7/06    (2006.01)

(52) U.S. Cl. .............. 62/507; 165/76; 165/164; 165/168; 165/170; 165/177; 165/178; 165/180; 165/181; 29/890.038; 126/661; 126/662

(58) Field of Classification Search .......... 62/507; 165/76, 170, 164, 168, 178, 180, 181, 177, 165/171; 126/661, 662; 29/890.038
See application file for complete search history.

(56) References Cited

U.S. PATENT DOCUMENTS

| 2,768,258 | A | * | 10/1956 | Donovan ................ 200/302.3 |
| 4,055,162 | A | * | 10/1977 | Gonzalez .................... 126/662 |
| 5,097,897 | A | * | 3/1992 | Watanabe et al. ........... 165/140 |
| 5,513,432 | A | * | 5/1996 | Sasaki et al. ........... 29/890.038 |
| 5,906,045 | A | * | 5/1999 | Kim ...................... 29/890.07 |
| 5,983,995 | A | * | 11/1999 | Shutou et al. .......... 165/104.33 |
| 6,009,936 | A | * | 1/2000 | Kubota et al. .............. 165/183 |
| 6,840,314 | B1 | * | 1/2005 | Rivis et al. ................. 165/170 |
| 2004/0256093 | A1 | * | 12/2004 | Beltran | |

FOREIGN PATENT DOCUMENTS

| KR | 0160867 | 8/1998 |
| KR | 10-0228820 | 8/1999 |
| KR | 10-023770 | 10/1999 |
| KR | 10-2000-0021484 | 4/2000 |
| KR | 2002-0029141 | 4/2002 |
| KR | 2002-0072629 | 9/2002 |
| KR | 2003-0005599 | 1/2003 |

* cited by examiner

Primary Examiner—Melvin Jones
Assistant Examiner—Filip Zec
(74) Attorney, Agent, or Firm—Rabin & Berdo, PC (57) ABSTRACT

The present invention relates to a condenser for radiating heat of a high temperature and high pressure refrigerant discharged from a compressor to room temperature air and cooling water to condense and liquefy the refrigerant, and more particularly, to a condenser provided with a condensing tube and a cooling plate for helping heat radiation of the condensing tube, the condensing tube and the cooling plate being provided in various structures, thereby improving a condensation efficiency. The condenser includes: a condensing tube 10 including a refrigerant inlet 12 formed at one end thereof, a refrigerant outlet 14 formed at the other end thereof, and a passage pipe 16 having a heat radiation protrusion formed on an outer circumference thereof; and a cooling plate having a groove 22 on which the condensing tube is mounted so as to prevent a separation of the condensing tube, and a plurality of bent pieces 24 formed protruding from left and right sides of the groove 22.

8 Claims, 9 Drawing Sheets

FIGURE 11 ically produce, it is a condenser.

CONDENSER

BACKGROUND OF THE INVENTION

1. Field of the Invention

The present invention relates to a condenser for radiating heat of a high temperature and high pressure refrigerant discharged from a compressor to room temperature air and cooling water to condense and liquefy the refrigerant, and more particularly, to a condenser provided with a condensing tube and a cooling plate for helping heat radiation of the condensing tube, the condensing tube and the cooling plate being provided in various structures, thereby improving a condensation efficiency.

2. Description of the Related Art

In general, the condenser existing on the cooling cycle is a core element in performing heat exchange while refrigerant gas compressed to a high temperature and high pressure radiates heat outside the cabinet and is transformed into liquid refrigerant so that temperature drops.

The condensers performing the aforementioned role are classified into the water cooling type, which radiates heat of the condenser using cooling water such that the condensation efficiency is enhanced, and the air cooling type, which radiates heat of the condenser using air or a separate auxiliary device such as a blower fan. Hereinbelow, the air cooling type condenser widely employed in home refrigerator will be described. The air cooling type condenser is constructed to be connected between the compressor for compressing refrigerant vaporized by heat exchange of the evaporator to a high temperature and high pressure refrigerant, and a capillary tube for preventing the high temperature and high pressure refrigerant to be introduced directly into the evaporator. The condensing tube is bent in a predetermined shape so as to increase unit area on an inner side surface of the cabinet, and is coupled on the cooling plate by a plurality of fixing pieces. The condensing tube constructed as above is located and coupled on a plurality of wires by welding.

The conventional condenser having the aforementioned construction exchanges heat in the condensing tube transferring a high temperature refrigerant, so that first heat radiation is performed.

The condensing tube whose temperature is elevated again exchanges heat at a line contact portion with the welded and fixed portion so that a second heat radiation is performed by the wire or the cooling plate.

Thus, since the first and second heat radiations occur only at the condensing tube and the wire or cooling plate of line-contacted portion, the conventional condenser has a drawback in that its condensation efficiency is low.

Also, in order to elevate the condensation efficiency according to the capacity of the product to which the condenser having the aforementioned construction is applied, the condensing tube, the wire or the cooling plate is made large in proportional to the capacity of the product. To this end, a difficulty in manufacturing the product is caused since the condenser is also obliged to be large-sized in proportional to the increase in the capacity of the product, and the productivity is lowered due to the increase of manufacturing costs.

In addition, since the condensing tube and the cooling plate are fixed at their line contact portion by bands or welding, the wire or the cooling plate is easily separated from the condensing tube by the reasons of vibration or corrosion due to the external impact or long period use of the cooling apparatus. To this end, there is a difficulty in management of the apparatus, such as maintenance and repair.

SUMMARY OF THE INVENTION

Accordingly, the present invention is directed to a condenser that substantially obviates one or more problems due to limitations and disadvantages of the related art.

An object of the present invention to provide a condenser with an improved condensation efficiency by maximizing the contact portion between the condensing tube and the cooling plate to make heat exchange easy.

Another object of the present invention is to provide a condenser in which a heat radiation protrusion or a heat radiation wing is further formed on an outer circumference of be condensing tube transferring refrigerant to improve the condensation efficiency together with an easy heat radiation.

A further object of the present invention is to provide a condenser in which a vent part or a through hole is further provided in the cooling plate such that air in atmosphere circulates between inside and outside of the cooling plate, thereby improving a cooling efficiency together with an easy heat radiation.

A further another object of the present invention is to provide a condenser, which is bent several times for miniaturization and made in a hexahedron shape to increase a ratio of area per unit volume and minimize the area occupied by the condenser so that the product is light-weighted and manufacturing costs are lowered to enhance the productivity.

A further still another object of the present invention is to provide a condenser in which a bent piece is further provided in the cooling plate such that the condensing tube is firmly fixed to the cooling plate, thereby preventing the wire or the cooling plate from being easily separated from the condensing tube by the reasons of vibration or corrosion due to the external impact or long period use of the cooling apparatus and saving maintenance and repair costs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a condenser comprising: a condensing tube including a refrigerant inlet formed at one end thereof, a refrigerant outlet formed at the other end thereof, and a passage pipe having a heat radiation protrusion formed on an outer circumference thereof; and a cooling plate having a groove on which the condensing tube is mounted so as to prevent a separation of the condensing tube, and a plurality of bent pieces formed protruding from left and right sides of the groove.

Preferably, the heat radiation protrusion comprises a plurality of first heat radiation protrusions protruded in a pyramid shape, the plurality of first heat radiation protrusions being not formed on a part of the outer circumference of the condensing tube mounted on the groove and face-contacting the cooling plate.

Preferably, the heat radiation protrusion comprises a plurality of second heat radiation protrusions protruded in a serration shape where a triangle protrusion is attached on the outer circumference of the cooling tube, the plurality of second heat radiation protrusions being not formed on a part of the outer circumference of the condensing tube mounted on the groove and face-contacting the cooling plate.

Preferably, the heat radiation protrusion comprises a plurality of heat radiation wings each having an apex portion and a space defined between the apex portions, the plurality of heat radiation wings being not formed on a part of the outer circumference of the condensing tube mounted on the groove and face-contacting the cooling plate.

Preferably, the cooling plate has a bent portion bent in a groove shape having a predetermined depth, and a vent portion including a plurality of vent holes defined at a side portion of the bent portion, for circulating external air.

Preferably, the vent part comprises a first vent part having a plurality of depressed portions and a second vent part a plurality of protruded portions.

Preferably, the cooling plate has a rectangle shaped through hole defined between a plurality of grooves.

In another aspect of the present invention, there is provided condenser comprising: a condensing tube constructed in a passage pipe including a refrigerant inlet formed at one end thereof and a refrigerant outlet formed at the other end thereof; and a cooling plate having a groove on which the condensing tube is mounted so as to prevent a separation of the condensing tube, and a plurality of bent pieces formed protruding from left and right sides of the groove, the cooling plate being bent in a multi-layer structure of a three dimension to increase an area ratio per unit volume.

Preferably, the aforementioned condenser is bent in a hexahedron shape of a three dimension.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
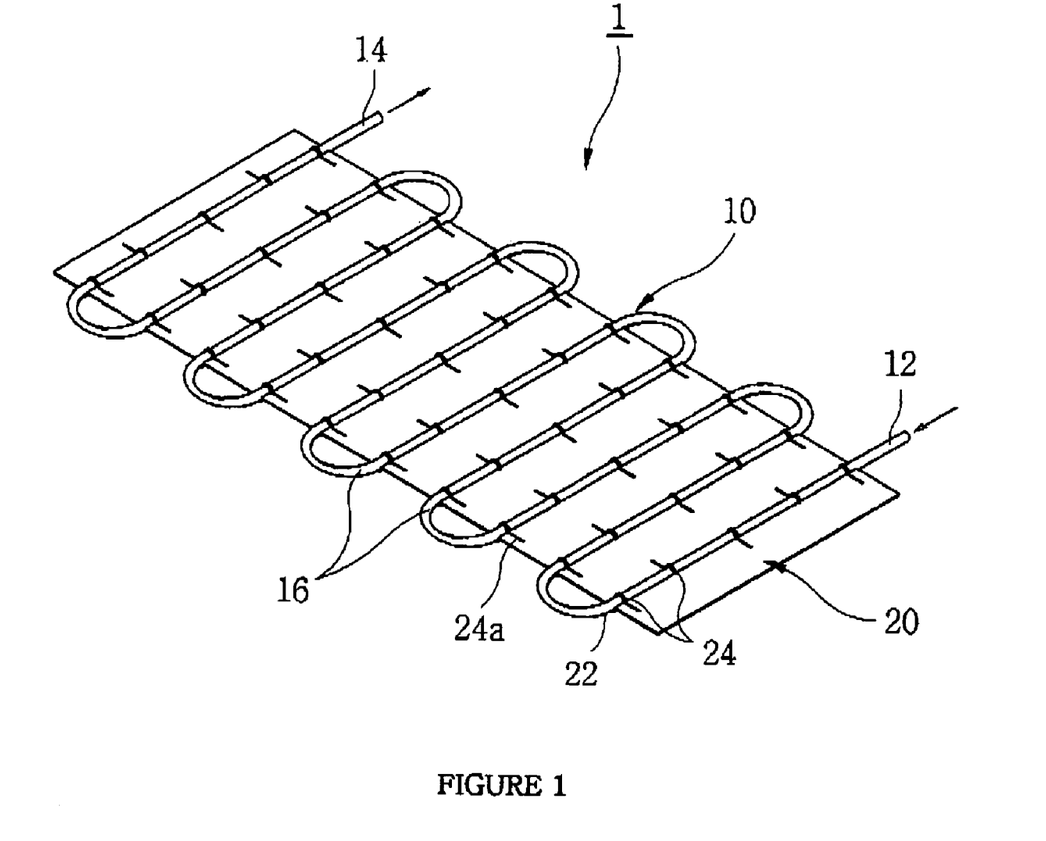
FIG. 1 is a perspective view of a condenser according to a first embodiment of the present invention.

FIG. 1 is a perspective view of a condenser according to a first embodiment of the present invention. The condenser 1 according to the first embodiment includes a condensing tube 10 for transferring refrigerant, and a cooling plate 20 fixing the condensing tube 10 and helping heat radiation.

The condensing tube 10 is configured to include a refrigerant inlet 12 formed at one end thereof, a refrigerant outlet 14 formed at the other end thereof, and a passage pipe shaped in a zigzag, for radiating heat until refrigerant introduced through the refrigerant inlet 12 is discharged through the refrigerant outlet 14.

Figure 2:
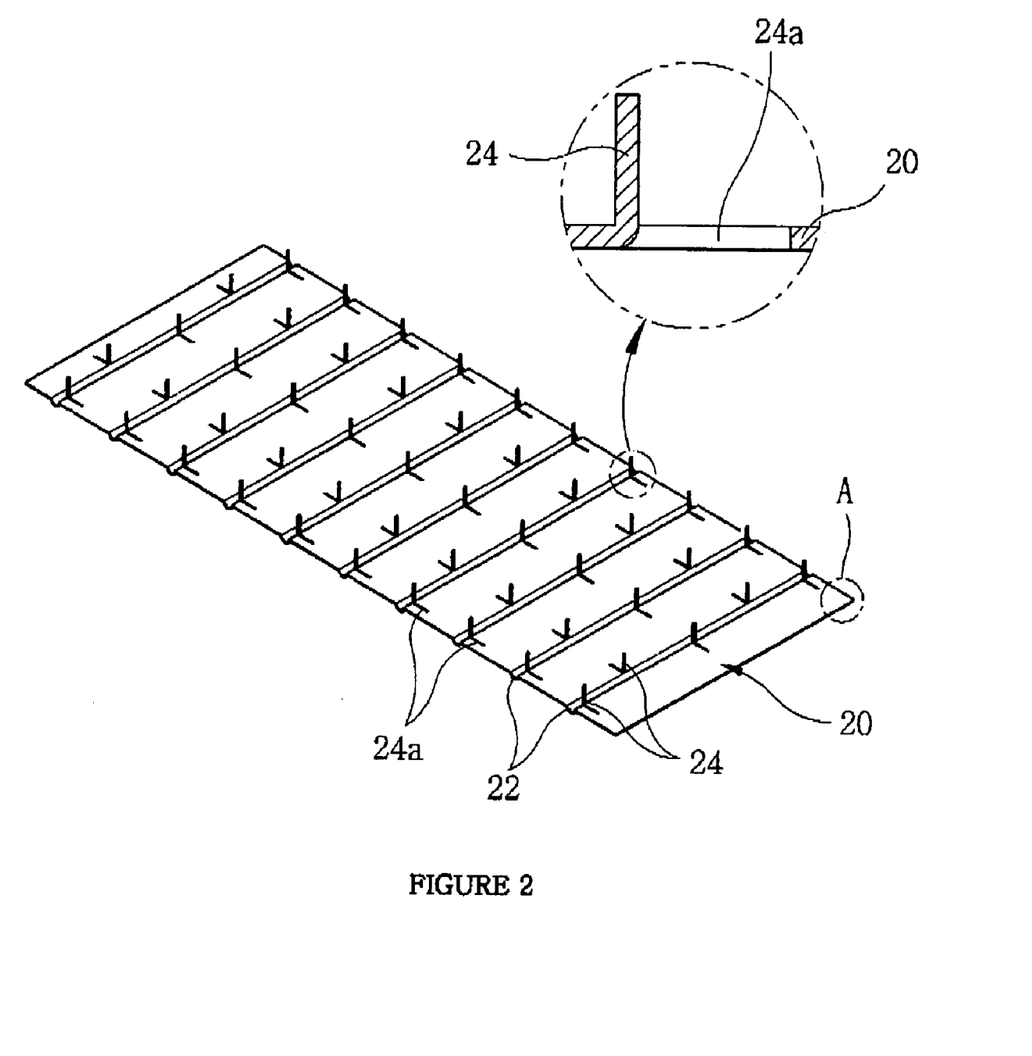
FIG. 2 is a perspective view of a cooling plate according to a first embodiment of the present invention.

FIG. 2 is a cutaway perspective view of the cooling plate. The cooling pate 20 is shaped in a thin plate, and is configured to include a plurality of grooves 22 and a plurality of bent pieces 24 for coupling and fixing the passage pipe 16 mounted on the grooves 22. The plurality of groves 22 allow the passage pipe 16 to be mounted thereon such that the passage pipe 16 contacts the cooling plate 20 at a wider area.

The grooves 22 are formed in a semicircle shape for more effective contact between the condensing tube 10 and the cooling plate 20, considering that the condensing tube 10 is generally shaped in a circle.

The bent pieces 24 are formed integrally with the cooling plate 20, of which one end extends from the cooling plate 20 and the other end is separated from the cooling plate 20 to couple and fix the passage pipe 16 mounted on the grooves 22.

Also, in coupling and fixing the passage pipe 16 using one end of the bent piece 16, the one end of the bent piece 24 and the passage pipe 16 may be fixed by a dot welding.

The bent pieces 24 are formed in the length direction of the grooves 22. The bent pieces 24 can be formed only at one side of the grooves 22 but are preferably formed at both sides of the grooves 22 in a zigzag form.

In addition, the bent piece 24 extending from the cooling plate 20 is cut away and then bent so that a cutaway hole 24a is formed at the cutaway portion.

The heat radiation operation of the condenser constructed as above will be described hereinbelow.

First, while high temperature refrigerant introduced into the refrigerant inlet 12 fixed to the cooling plate 20 is transferred to the refrigerant outlet 14, the high temperature refrigerant exchanges heat by the passage pipe 16 kept in a lower temperature than the high temperature refrigerant so that a first heat radiation is carried out.

Also, heat is exchanged at a face contact portion between the passage pipe 16 and the grooves 22 of the cooling plate 20 on which the passage pipe 16 is mounted so that a second heat radiation is carried out.

A third heat radiation occurs at the grooves 22 whose temperature is elevated by the twice heat radiation, by the cooling plate 20.

Due to the third heat radiation, the high temperature cooling plate 20 exchanges heat with air so that a fourth heat radiation is carried out.

Especially, external air circulates the inside and outside of the cooling plate 20 through the cutaway hole 24a made in the cooling plate 20 so as to form the bent piece 24 so that heat is exchanged with ease.

Thus, since the inventive condenser performs four times heat radiations compared with the conventional condenser performing twice heat radiations, high condensation efficiency can be obtained.

Figure 3A:
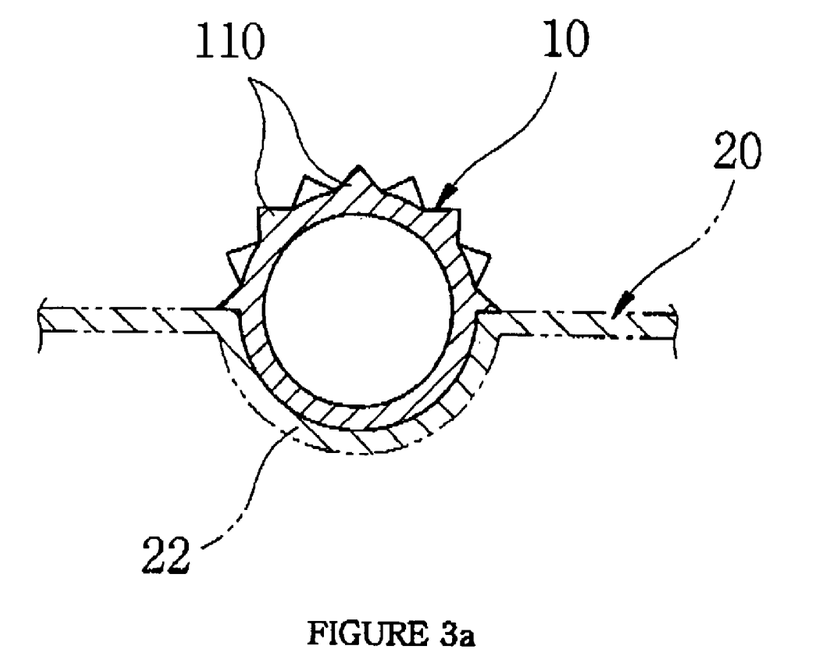
FIGS. 3A to 3C are sectional views illustrating various structures of a condensing tube.
Figure 3B:
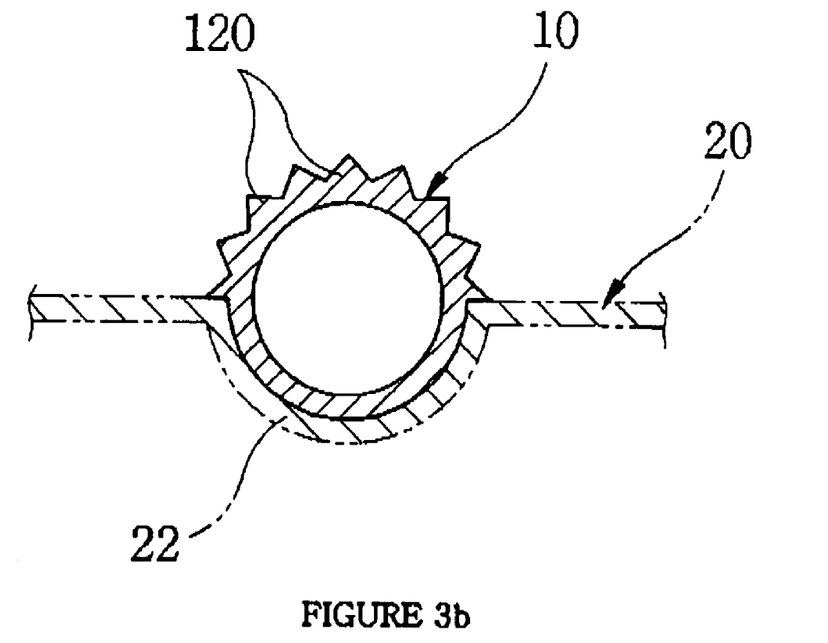
Figure 3C:
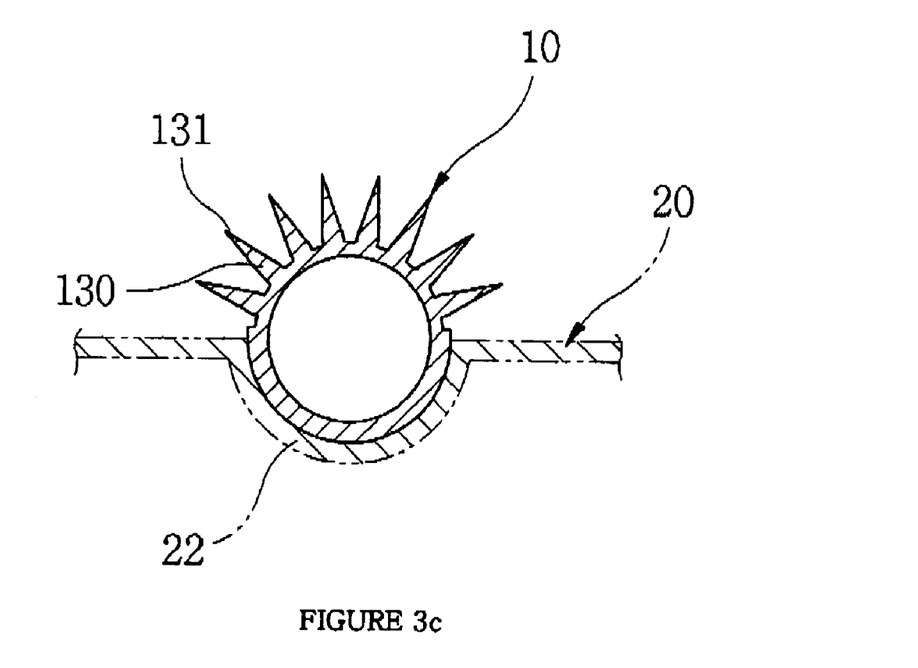

FIGS. 3A to 3C are sectional views illustrating various structures of a condensing tube so as to enhance the heat radiation effect.

First, referring to FIG. 3A, a plurality of first heat radiation protrusions 110 are formed on an outer circumference of the condensing tube 10 in the form of pyramid at a constant interval.

Referring to FIG. 3B, a plurality of second heat radiation protrusions 120 are formed on an outer circumference of the condensing tube 10 in the form of serration where triangles are attached on the outer circumference of the condensing tube 10.

Referring to FIG. 3C, a plurality of heat radiation wings 130 are formed on an outer circumference of the condensing tube 10. The heat radiation wings 130 have a predetermined height. Each of the heat radiation wings 130 has an apex portion 131. Between the apex portions, a space is defined for smooth air circulation.

When the condensing tube 10 is mounted on the grooves 22 of the cooling plate 10, it is requested that the first and second heat radiation protrusions 110 and 120, and the heat radiation wings 130 be not formed on their face contact portions.

Also, the first and second heat radiation protrusions 110 and 120, and the heat radiation wings 130 are formed in the length direction on the condensing tube 10.

When the condensing tube 10 is mounted on the grooves 22 and then is coupled and fixed by the bent piece 24, it is desirable that the first and second heat radiation protrusions 110 and 120, and the heat radiation wings 130 do not interfere with each other.

FIGS. 4 to 8 are perspective view and sectional views of various shapes of a cooling plate configured to enhance the heat radiation effect.

Figure 4:
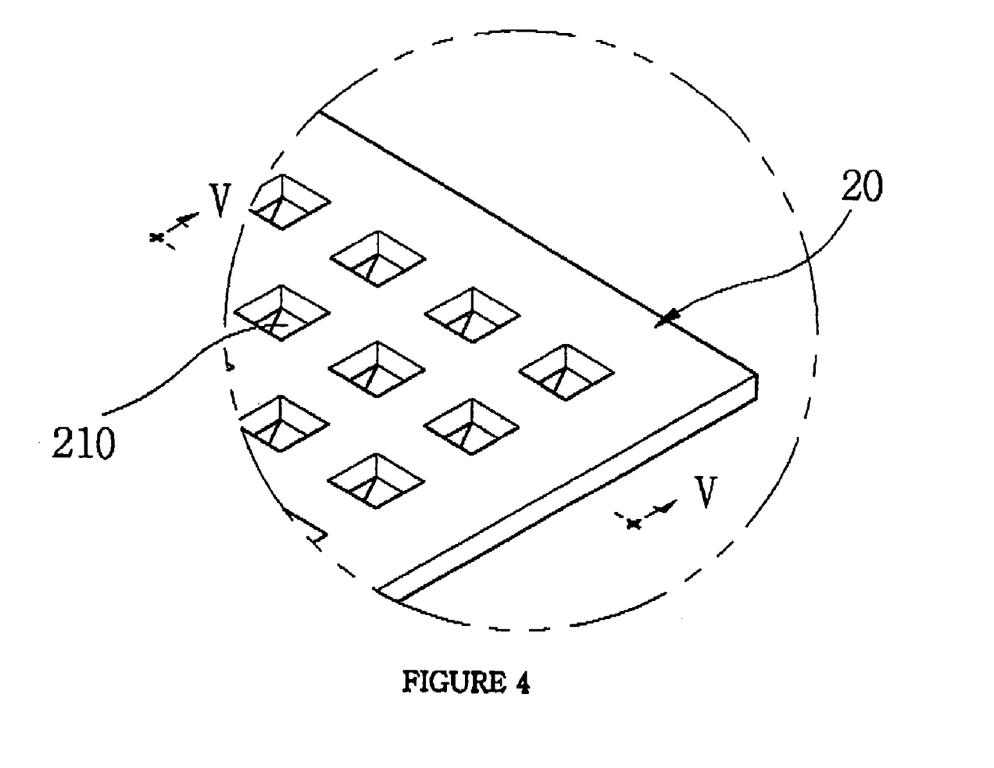
FIG. 4 is a detailed view of the portion "A" in FIG. 2.
Figure 5:
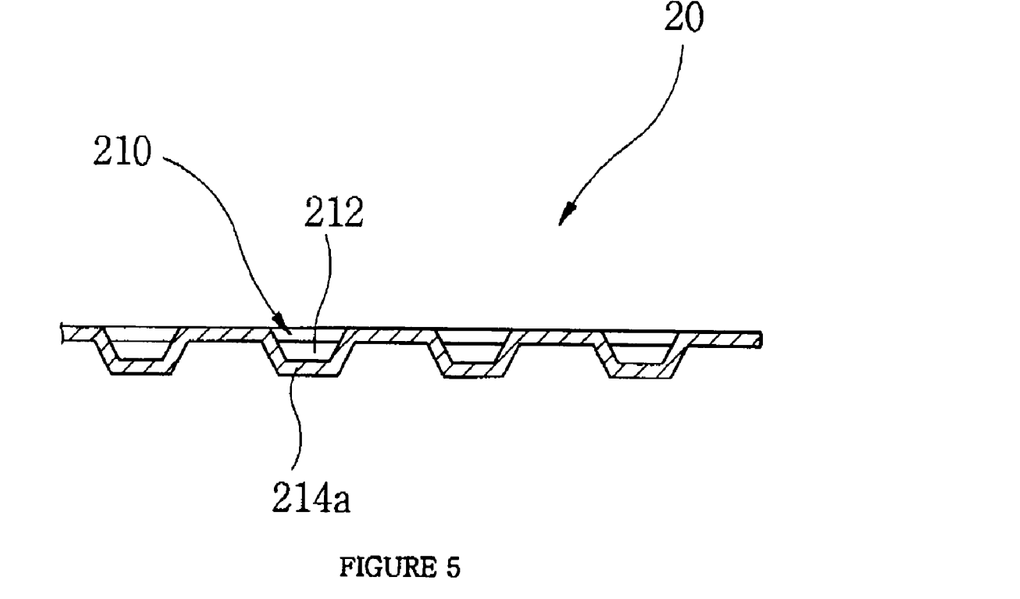
FIG. 5 is a sectional view taken along the line V—V of FIG. 4.

Referring to FIGS. 4 and 5, the cooling plate includes a plurality of vent portions 210.

Each of the vent portions 210 has a bent portion 214a bent in the form of a groove having a predetermined depth. A vent hole 212 is formed at a bent side portion of the bent portion 214a such that air is circulated to an outside.

Alternatively, the vent hole 210 can be made in a perforated plate such that only the vent hole 212 is formed without the bent portion 214a.

Alternatively, the bent portions 210 can be formed in the entire surface of the cooling plate 20, but are preferably not formed on the plurality of grooves 22.

Figure 6:
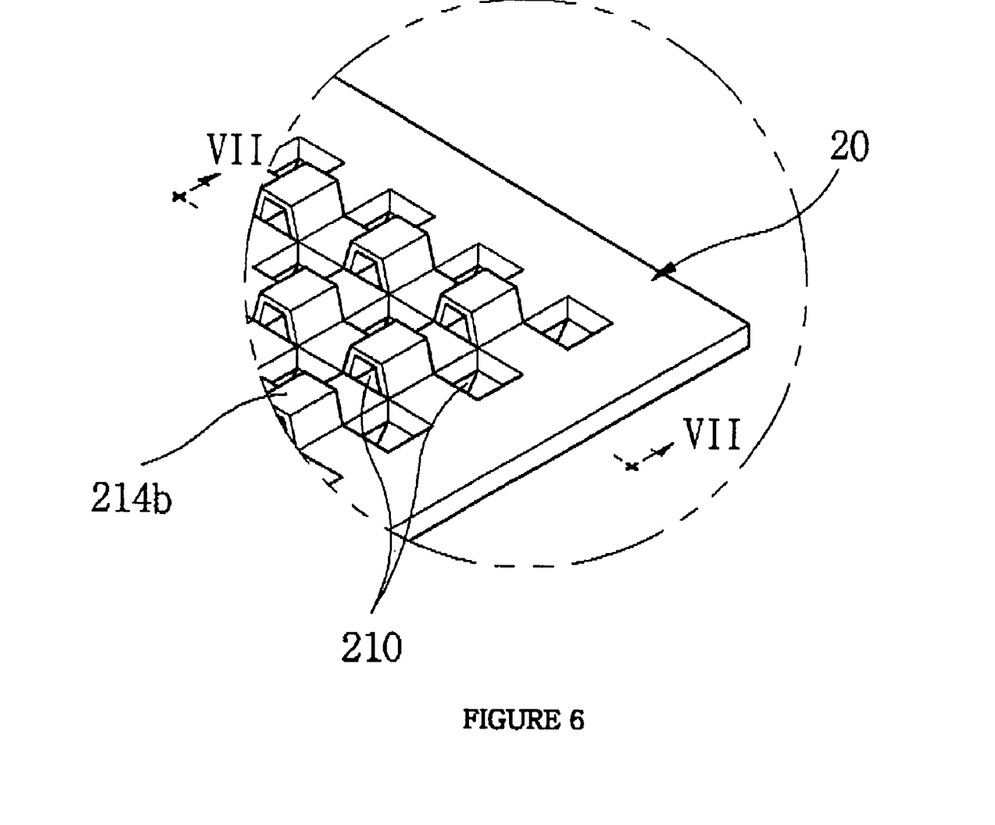
FIG. 6 is a partial sectional view of a cooling plate.
Figure 7:
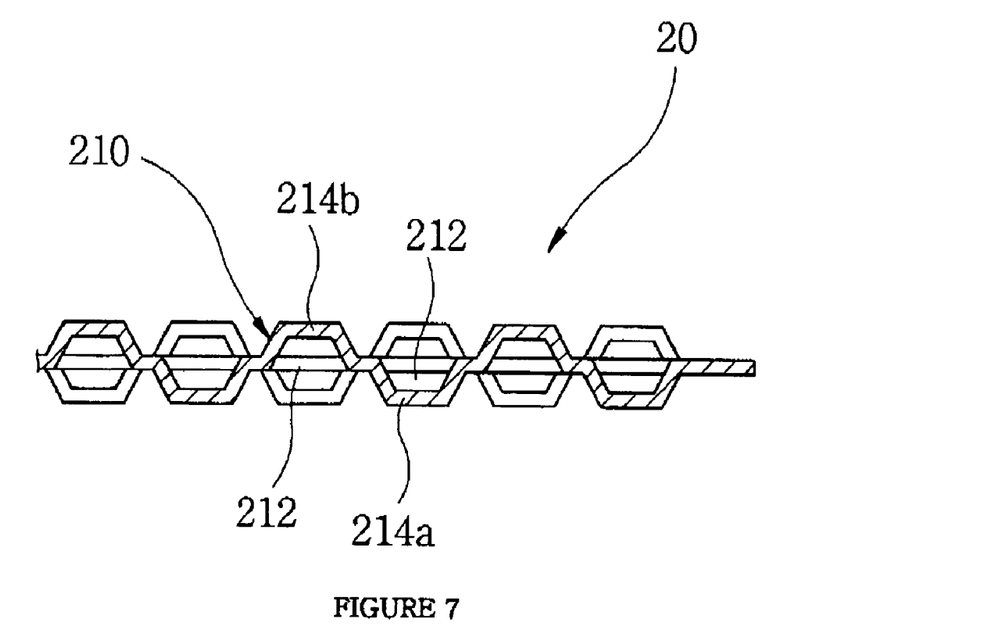
FIG. 7 is a sectional view taken along the line VII—VII in FIG. 6.

Referring to FIGS. 6 and 7, the vent portions 214a, 214b of the vent portions 210 are formed in a matrix structure by bending a cutaway portion for the formation of the vent holes 212.

The bent portion 214a of the vent portion 210 is formed by depressing the bent portion of the vent hole 212 and the bent portion 214b is formed by protruding the bent portion of the vent hole 212.

Figure 8A:
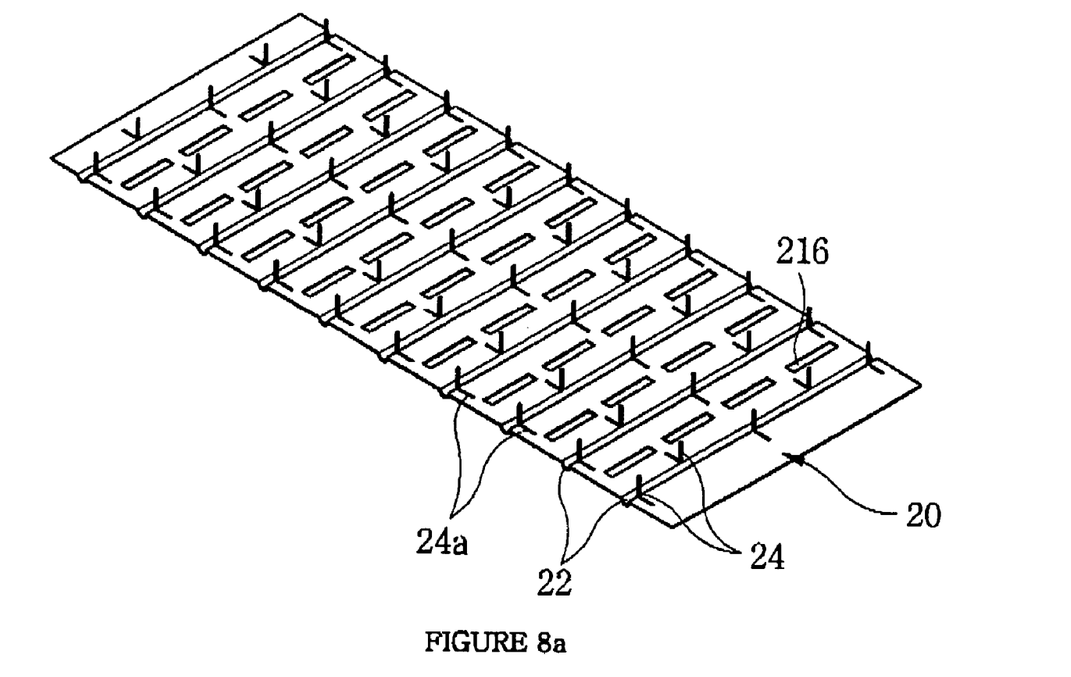
FIG. 8A is a perspective view of a cooling plate provided with a through hole.

Referring to FIG. 8A, the cooling plate 20 further includes rectangle-shaped through holes 216 formed between the plurality of grooves 22.

Figure 8B:
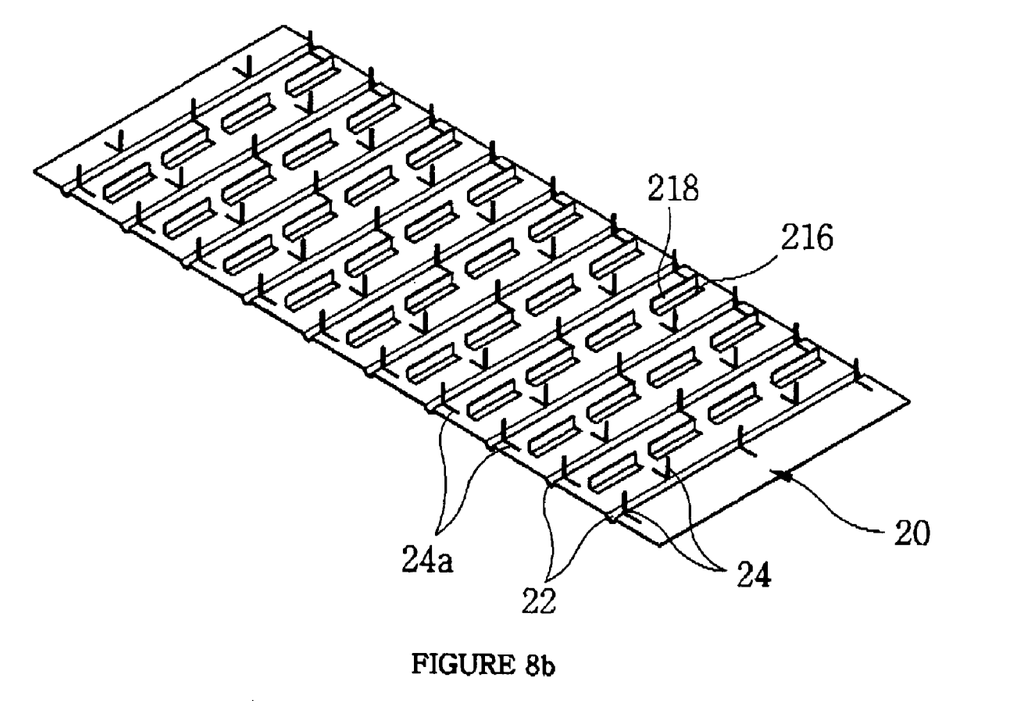
FIG. 8B is a perspective view of a cooling plate further provided with a protruded piece compared with the cooling plate of FIG. 8A.

Referring to FIG. 8B, the rectangle shaped vent hole 216 is made in the form of a protruded portion by cutting a predetermined portion of the cooling plate 20 in a rectangle shape and bending one end.

The proposed condensing tube and cooling plate in various structures are to make heat exchange with air easy and thereby enhance the condensation efficiency. Accordingly, other shapes other than the currently proposed shapes will be also possible if they meet the above object.

Also, while the condensing tube and the cooling plate are preferably made of metal material having good heat conductivity, their material is not limited only to metal material.

Figure 9:
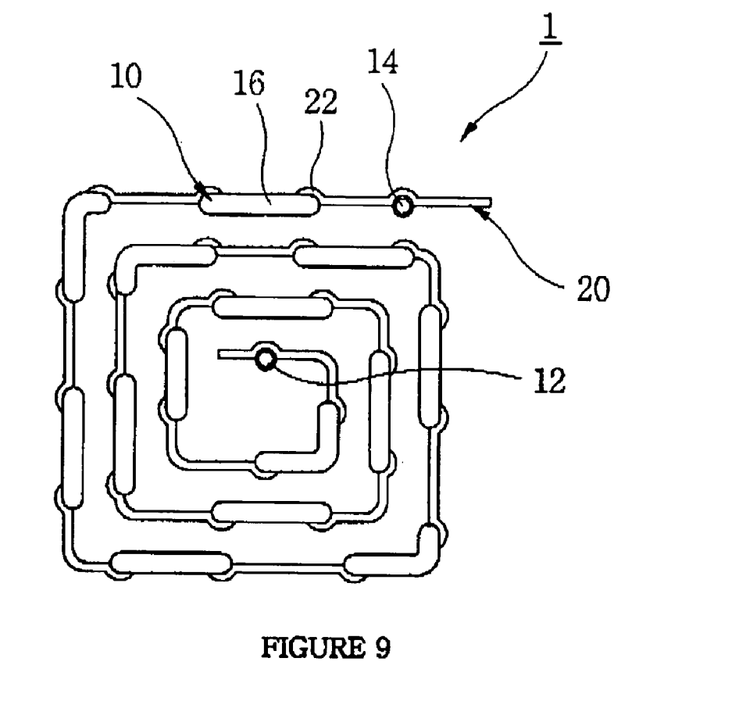
FIG. 9 is a front view of a condenser according to a second embodiment of the present invention.

FIG. 9 is a front view of a condenser employing a condensing tube according to a second embodiment of the present invention, the condenser being in a bent state. The condenser 1 is formed in a hexahedral structure where the condenser 1 is bent in a multi-layer structure so as to maximize the condensation efficiency per unit volume.

The construction of the condenser according to the second embodiment has an effect that the dedicated area occupied by the condenser in a product is minimized with the same condensation efficiency as that of the conventional flat condenser.

In other words, the conventional condenser has to occupy a wide area of a flat structure so as to increase the heat radiation effect, so that the size of the product employing the conventional condenser is also increased. However, since the condenser according to the second embodiment can minimize the dedicated area, the product employing the condenser according to the second embodiment can be manufactured in a small size so that space efficiency is enhanced.

In the meanwhile, the condenser according to the second embodiment may be formed in a circular structure bent in a multi-layer structure as well as the aforementioned hexahedral structure.

Figure 10:
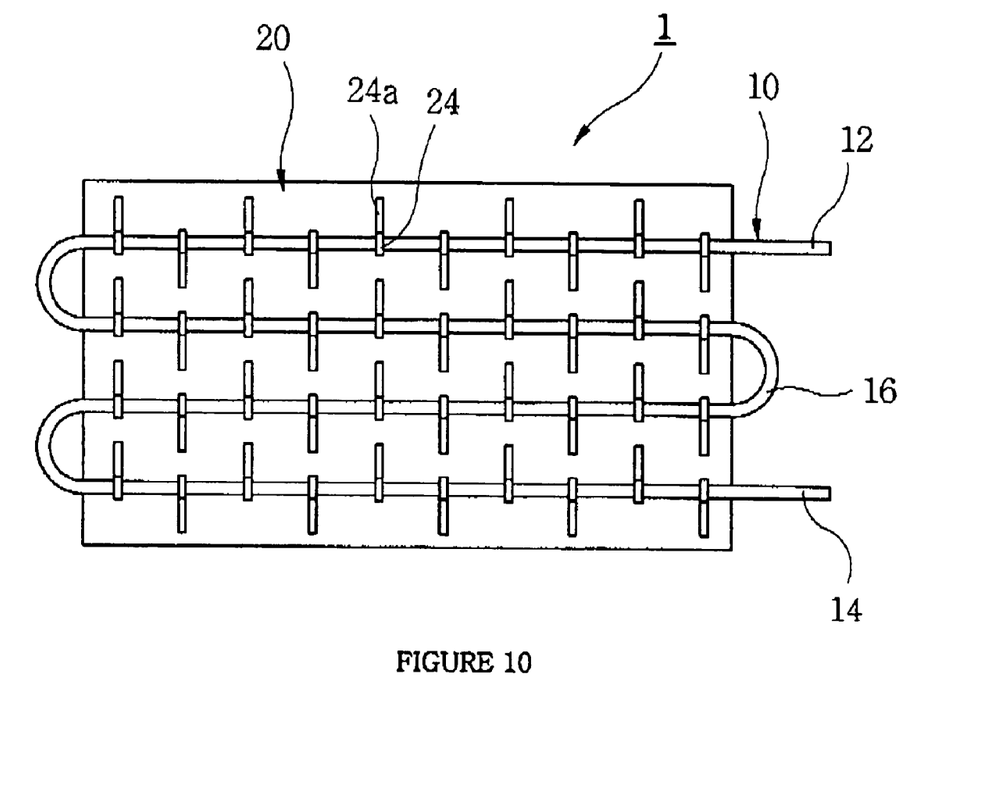
FIG. 10 is a plane view of a condenser depicted in a length direction.

FIG. 10 is a plane view of a condenser depicted in a length direction. In FIG. 10, the condensing tube 10 is mounted on the cooling plate 20 in the length direction of the cooling plate 20 depending on installation location and condensation efficiency of a product employing the condenser 1.

Figure 11:
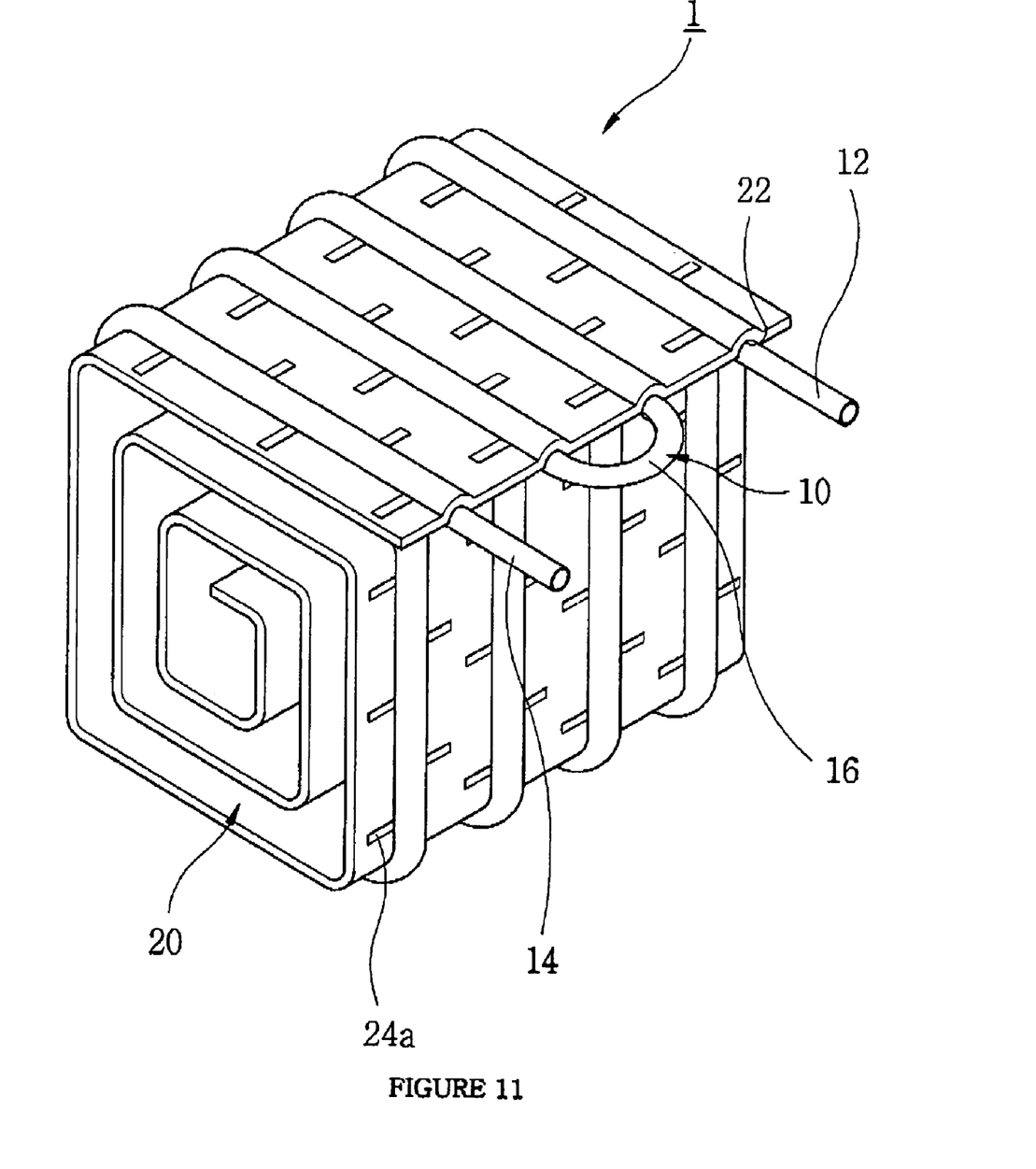
FIG. 11 a perspective view of the condenser of FIG. 10, which is bent in a spiral structure.

FIG. 11 a perspective view of the condenser of FIG. 10 as bent. As shown in FIG. 11, the condenser 1 on which the condensing tube 10 is mounted in the length direction of the cooling plate 20 is bent in a multi-layer structure, thereby enhancing the area ratio per unit volume and enabling the miniaturization and lightweight of products employing the condenser 1.

As described previously, according to the condenser of the present invention, the contact portion between the condensing tube and the cooling plate is maximized to make heat exchange easy, so that the condensation efficiency is enhanced.

Also, a heat radiation protrusion or a heat radiation wing is further provided on an outer circumference of the condensing tube to perform a first easy heat radiation, thereby enhancing the condensation efficiency.

In addition, a vent portion or a through hole is further provided in the cooling plate such that air in atmosphere circulates between inside and outside of the cooling plate for an easy heat radiation, thereby enhancing the condensation efficiency.

Further, the condenser is bent several times for miniaturization and made in a hexahedron shape to increase a ratio of area per unit volume and minimize the dedicated area occupied by the condenser so that the product is light-weighted and manufacturing costs are lowered to enhance the productivity.

Furthermore, a bent piece is further provided in the cooling plate such that the condensing tube is firmly fixed to the cooling plate, thereby preventing the wire or the cooling plate from being easily separated from the condensing tube by the reasons of vibration or corrosion due to the external impact or long period use of the cooling apparatus and saving maintenance and repair costs.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A condenser, comprising:
   a condensing tube including a refrigerant inlet formed at one end thereof, a refrigerant outlet formed at another end thereof, and a passage pipe having a heat radiation protrusion formed on an outer circumference thereof, the heat radiation protrusion comprising a plurality of pyramid-shaped heat radiation protrusions; and
   a cooling plate having a groove on which the condensing tube is mounted so as to prevent a separation of the condensing tube, and a plurality of bent pieces formed protruding from left and right sides of the groove;
   wherein the plurality of heat radiation protrusions are not formed on a part of the outer circumference of the condensing tube mounted on the groove that face-contacts the cooling plate.

2. A condenser, comprising:
   a condensing tube including a refrigerant inlet formed at one end thereof, a refrigerant outlet formed at another end thereof, and a passage pipe having a heat radiation protrusion formed on an outer circumference thereof, the heat radiation protrusion comprising a plurality of heat radiation protrusions protruded in a serration shape where a triangle protrusion is attached on the outer circumference of the cooling tube; and
   a cooling plate having a groove on which the condensing tube is mounted so as to prevent a separation of the condensing tube, and a plurality of bent pieces formed protruding from left and right sides of the groove;
   wherein the plurality of heat radiation protrusions are not formed on a part of the outer circumference of the condensing tube mounted on the groove that face-contacts the cooling plate.

3. A condenser, comprising:
   a condensing tube including a refrigerant inlet formed at one end thereof, a refrigerant outlet formed at another end thereof, and a passage pipe having a heat radiation protrusion formed on an outer circumference thereof, the heat radiation protrusion comprising a plurality of heat radiation wings each having an apex portion and a space defined between the apex portions; and
   a cooling plate having a groove on which the condensing tube is mounted so as to prevent a separation of the condensing tube, and a plurality of bent pieces formed protruding from left and right sides of the groove;
   wherein the plurality of heat radiation wings are not formed on a part of the outer circumference of the condensing tube mounted on the groove that face-contacts the cooling plate.

4. The condenser of claim 1, wherein the cooling plate has a bent portion bent in a groove shape having a predetermined depth, and a vent part including a plurality of vent holes defined at a side portion of the bent part, for circulating external air.

5. The condenser of claim 4, wherein the vent part comprises a first vent part having a plurality of depressed portions and a second vent part having a plurality of protruded portions.

6. The condenser of claim 1, wherein the cooling plate has a rectangle shaped through hole defined between a plurality of grooves.

7. A condenser comprising:
   a condensing tube constructed from a passage pipe having a refrigerant inlet formed at one end thereof and a refrigerant outlet formed at another end thereof, the condensing tube comprising a plurality of heat radiation protrusions formed on an outer circumference thereof; and
   a cooling plate having a groove on which the condensing tube is mounted so as to prevent a separation of the condensing tube, and a plurality of bent pieces formed protruding from left and right sides of the groove, the cooling plate being bent in a multi-layer structure of a three dimension to increase an area ratio per unit volume;
   wherein the plurality of heat radiation protrusions are not formed on a part of the outer circumference of the condensing tube mounted on the groove that face-contacts the cooling plate.

8. The condenser of claim 7, wherein the cooling plate is bent in a hexahedron, three-dimensional shape.

* * * * *